(12) United States Patent
Song et al.

(10) Patent No.: US 9,952,374 B2
(45) Date of Patent: Apr. 24, 2018

(54) DISPLAY DEVICE

(71) Applicant: Samsung Display Co., Ltd., Yongin-Si, Gyeonggi-Do (KR)

(72) Inventors: Hyun-hwa Song, Hwaseong-si (KR); Chan-jae Park, Osan-si (KR); Hayoung Lee, Seoul (KR); Seunghwan Chung, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 3 days.

(21) Appl. No.: 15/196,254

(22) Filed: Jun. 29, 2016

(65) Prior Publication Data
US 2017/0153377 A1 Jun. 1, 2017

(30) Foreign Application Priority Data

Dec. 1, 2015 (KR) .................. 10-2015-0170164

(51) Int. Cl.
*F21V 8/00* (2006.01)
*G02B 27/00* (2006.01)

(52) U.S. Cl.
CPC ......... *G02B 6/0033* (2013.01); *G02B 6/0068* (2013.01); *G02B 27/0025* (2013.01)

(58) Field of Classification Search
CPC .. G02B 6/0033; G02B 6/0068; G02B 6/0055; G02B 6/0088; G02B 27/0025

USPC .......................................................... 362/613
See application file for complete search history.

(56) References Cited

U.S. PATENT DOCUMENTS

2015/0247964 A1* 9/2015 Kamada ............... G02B 6/0043
349/65

FOREIGN PATENT DOCUMENTS

| JP | 2014186821 A | 10/2014 |
|---|---|---|
| KR | 1020100066001 A | 6/2010 |
| KR | 1020140037340 A | 3/2014 |
| KR | 1020160100006 A | 8/2016 |

\* cited by examiner

*Primary Examiner* — Karl D Frech
(74) *Attorney, Agent, or Firm* — Cantor Colburn LLP (57) ABSTRACT

A display device includes a display panel, a light guide plate disposed under the display panel, a light source which provides a side surface of the light guide plate with incident light, a reflective plate disposed under the light guide plate, a first optical adjustment member which includes first scattering particles which scatter a first color wavelength range of the incident light into a first value and scatter a second color wavelength range of the incident light into a second value, and a second optical adjustment member which includes second scattering particles which scatter the first color wavelength range of the incident light into a third value and scatter the second color wavelength range of the incident light into a fourth value.

20 Claims, 8 Drawing Sheets

Prior Art

DISPLAY DEVICE

This application claims priority to Korean Patent Application No. 10-2015-0170164, filed on Dec. 1, 2015, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a display device including an optical adjustment member including scattering particles.

2. Description of the Related Art

A display device generally includes a display panel displaying an image. The display panel includes a plurality of gate lines, a plurality of data lines, and a plurality of pixels connected to the plurality of gate lines and the plurality of data lines. The display device includes a gate driving part providing gate signals corresponding to the plurality of gate lines and a data driving part outputting data signals corresponding to the plurality of data lines.

Also, the display device includes a light source providing the display panel with light. The light source includes a light source part outputting light, and a plurality of optical members such as a light guide plate transmitting light to the display panel.

SUMMARY

Exemplary embodiments of the invention provide a display device including scattering particles for compensating for color distortion of a displayed image.

An exemplary embodiment of the invention provides a display device, including: a display panel including a displaying surface defined by a first direction and a second direction, a light guide plate disposed under the display panel, a light source which provides any one side surface extending in the first direction among side surfaces of the light guide plate with incident light, a reflective plate disposed under the light guide plate, a first optical adjustment member which is disposed between the reflective plate and the light guide plate and includes first scattering particles which scatter a first color wavelength range of the incident light into a first value and scatter a second color wavelength range of the incident light into a second value, where the difference between the first value and the second value is defined as a first difference value, and a second optical adjustment member which is disposed between the reflective plate and the light guide plate and includes second scattering particles which scatter the first color wavelength range of the incident light into a third value and scatter the second color wavelength range of the incident light into a fourth value, where the difference between the third value and the fourth value is defined as a second difference value higher than the first difference value, where the first difference value is adjusted according to sizes of first scattering particles, the second difference value is adjusted according to sizes of second scattering particles, and the first optical adjustment member is disposed more adjacent to the one side surface in the second direction than to the second optical adjustment member.

In an exemplary embodiment, the first optical adjustment member may overlap the second optical adjustment member in at least one portion.

In an exemplary embodiment, the first optical adjustment member, on the reflective plate, may be spaced apart from the second optical adjustment member in the second direction.

In an exemplary embodiment, the second optical adjustment member may be disposed adjacent to another side surface facing the one side surface in the second direction.

In an exemplary embodiment, when sizes of the first scattering particles and sizes of the second scattering particles are included within a first range, the second difference value may be greater than the first difference value as the sizes of the first and second scattering particles are smaller in the first range.

In an exemplary embodiment, the first range may be from about 0.15 micrometer ($\mu$m) to about 0.20 $\mu$m.

In an exemplary embodiment, the first color wavelength range may be defined as a wavelength range of blue light, and the second color wavelength range may be defined as a wavelength of any one of red or yellow light.

In an exemplary embodiment, areas of the first and second optical adjustment members may be different from each other.

In an exemplary embodiment of the invention, a display device includes: a display panel including a displaying surface defined by the first and second directions, a light guide plate disposed under the display panel, a light source which provides any one side surface extending in the first direction among side surfaces of the light guide plate with an incident light, a reflective plate disposed under the light guide plate, and an optical adjustment member which is disposed between the reflective plate and the light guide plate and includes scattering particles which scatter a first color wavelength range of the incident light into a first value and scatter a second color wavelength range of the incident light into a second value, where the difference between the first value and the second value is defined as a first difference value, the optical adjustment member being disposed adjacent to another side surface facing the one side surface in the second direction.

In an exemplary embodiment, when the sizes of the scattering particles are included within the first range, the first difference value may be greater as the sizes of the scattering particles are smaller in the first range.

In an exemplary embodiment, the first range may be from about 0.15 $\mu$m to about 0.20 $\mu$m.

In an exemplary embodiment, the optical adjustment member may contact the another side surface in the second direction.

In an exemplary embodiment, the first color wavelength range may be defined as a wavelength range of blue light, and the second color wavelength range may be defined as a wavelength range of any one of red or yellow light.

In an exemplary embodiment of the invention, a display device includes: a display panel including a displaying surface defined by the first and second directions, a light guide plate disposed under the display panel, a first light source which provides any one side surface extending in the first direction among side surfaces of the light guide plate with light, a second light source which provides another side surface facing the one side surface with incident light, a reflective plate disposed under the light guide plate, and an optical adjustment member which is disposed between the reflective plate and the light guide plate and includes scattering particles which scatter a first color wavelength range of the incident light into a first value and scatter a second color wavelength range of the incident light into a second value, where the difference between the first value and the second value is defined as a first difference value, the optical adjustment member being disposed on a central portion between the one side surface and the another side surface facing the one side surface in the second direction.

In an exemplary embodiment, the optical adjustment member may further include second scattering particles which scatter the first color wavelength range into the third value, scatter the second color wavelength range into the fourth value, the difference between the third and fourth values are defined as a second difference value greater than the first difference value.

In an exemplary embodiment, when the sizes of the scattering particles are included within the first range, the first difference value may be larger as the sizes of the scattering particles are smaller in the first range.

In an exemplary embodiment, the first range may be from about 0.15 μm to about 0.20 μm.

In an exemplary embodiment, the light guide plate may include a glass.

In an exemplary embodiment, the first color wavelength range may be defined as a wavelength range of blue light, and the second color wavelength range may be defined as a wavelength range of any one of red or yellow light.

In an exemplary embodiment, the reflective plate may include a first reflective region on which the scattering particles are not disposed and a second reflective region on which the scattering particles are disposed.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

The invention may be modified in many alternate forms, and thus specific embodiments will be exemplified in the drawings and described in detail. It should be understood, however, that it is not intended to limit the invention to the particular form disclosed, but rather, and the invention is to cover various modifications and equivalent arrangements included within the spirit and scope of the invention, including the appended claims.

In describing the drawings, like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. Terms are only used to distinguish one component from other components. For example, an element referred to as a first element in one embodiment can be referred to as a second element in another embodiment. The terms of a singular form may include plural forms unless referred to the contrary.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. The meaning of 'include' or 'comprise' specifies a property, a region, a fixed number, a step, a process, an element and/or a component but does not exclude other properties, regions, fixed numbers, steps, processes, elements and/or components.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1:
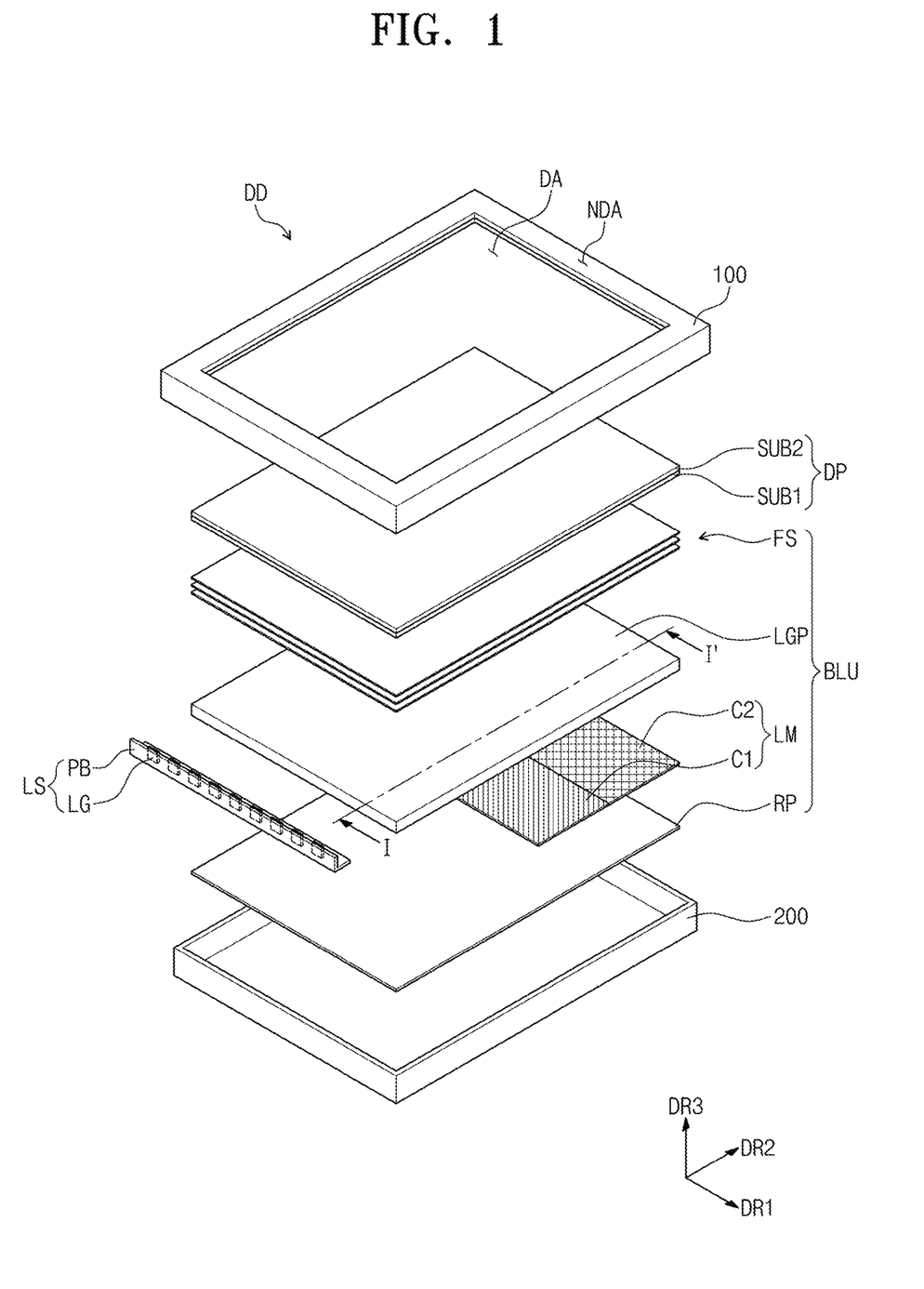
FIG. 1 is an exploded view of an exemplary embodiment of a display device according to the invention.
Figure 2:
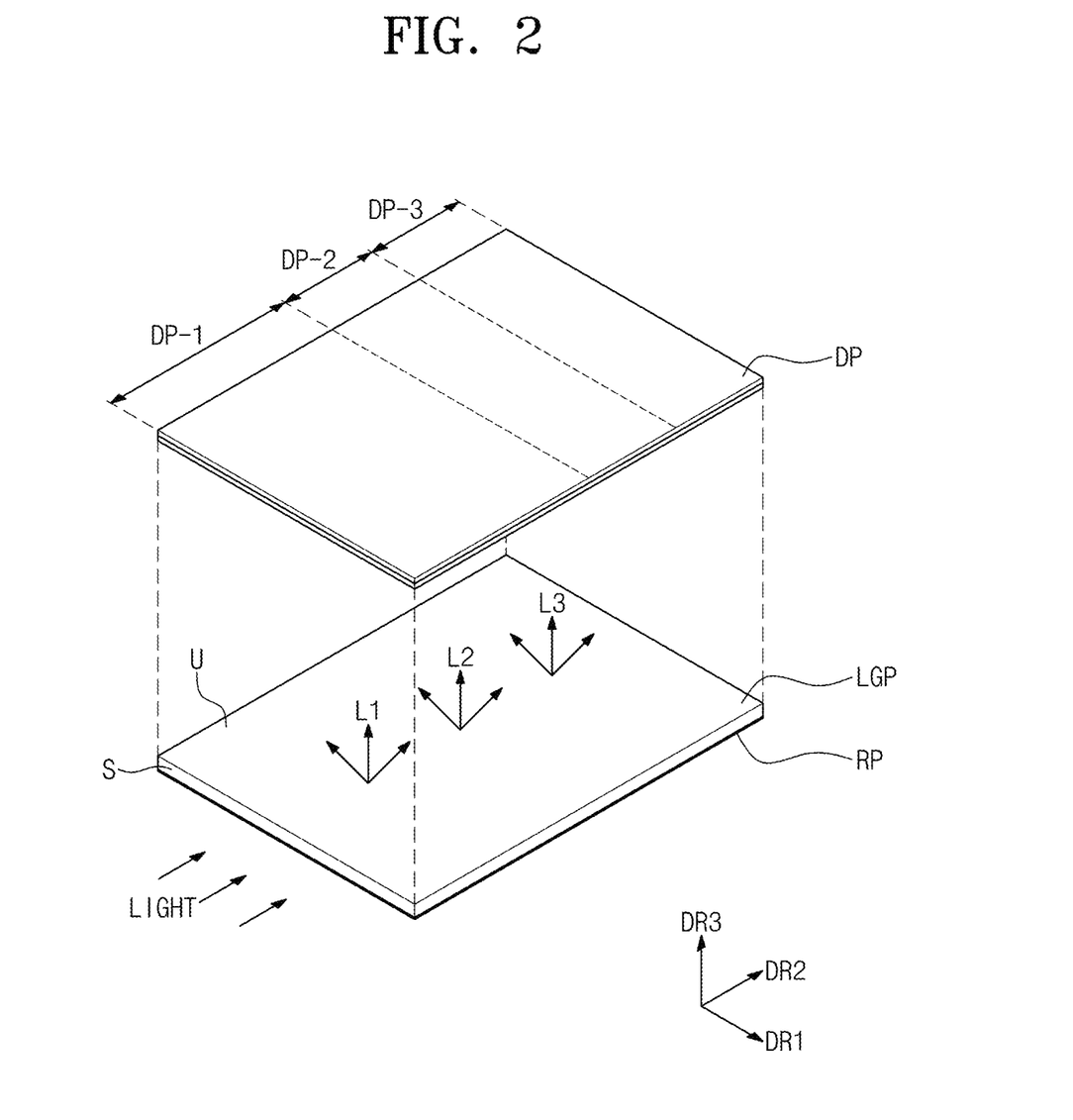
FIG. 2 is a view illustrating a path for providing a display panel illustrated in FIG. 1 with light.
Figure 3:
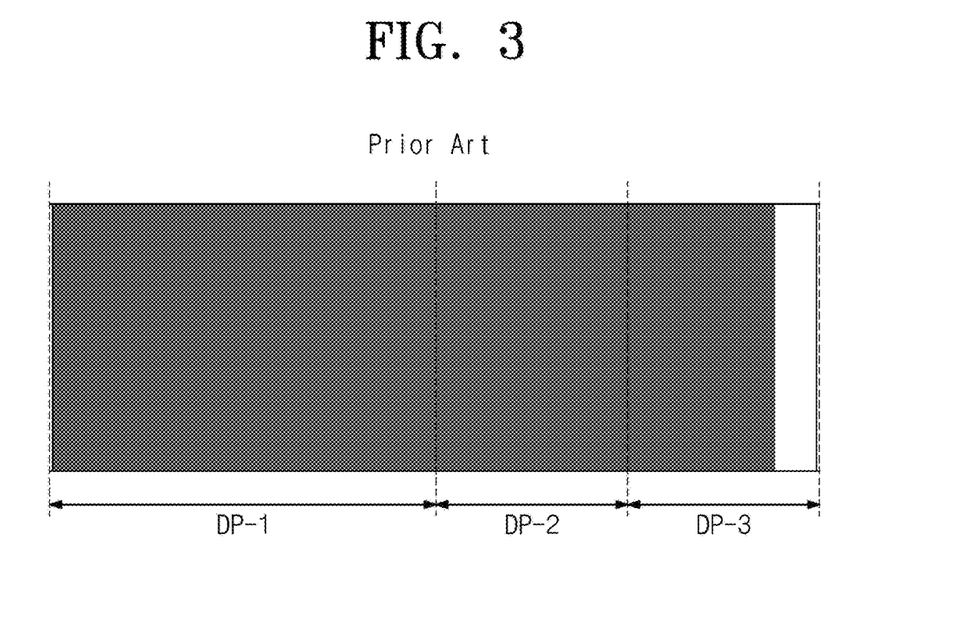
FIG. 3 is a view illustrating color distortion generated in a typical display panel.

FIG. 1 is an exploded view of a display device according to an exemplary embodiment of the invention. FIG. 2 is a view illustrating a path for providing a display panel illustrated in FIG. 1 with light. FIG. 3 is a view illustrating color distortion generated in a typical display panel.

A display device DD according to the invention may be used for a relatively large-sized electronic device, such as an outdoor advertising panel, and for small and medium size electronic apparatuses, such as personal computers, laptop computers, vehicle navigation apparatus, and cameras. Also, the display device DD according to the invention may include relatively small-sized electronic device, such as tablet PCs, smart phones, personal digital assistants ("PDAs"), portable multimedia players ("PMPs"), game consoles, wrist watch type electronic apparatuses, and the like. However, these are merely exemplified as examples, and the display device according to the invention may be used for other electronic devices unless departing from the invention. Also, although not shown, the display device DD may include a flexible shape.

Specifically, referring to FIG. 1, the display device DD includes a cover member 100, a receiving member 200, a display panel DP, and a backlight unit BLU.

The cover member 100 may be disposed on the display panel DP. The cover member 100 includes a display region DA transmitting an image provided by the display panel DP and a non-display region NDA adjacent to the display region DA. Although not shown, the cover member 100 may include a window member which transmits an image to the outside through the display region DA.

The receiving member 200 may receive the display panel DP and the backlight unit BLU and may be coupled to the cover member 100.

The display panel DP may be disposed between the cover member 100 and the backlight unit BLU. Specifically, the display panel DP includes a first substrate SUB1, a second substrate SUB2, and a liquid crystal layer (not shown) disposed between the first and second substrates SUB1 and SUB2. According to an exemplary embodiment of the invention, the display panel DP may be applied as a liquid crystal display panel, for example.

Specifically, the first substrate SUB1 may be disposed over the plurality of sheets FS included in the backlight unit BLU. Although not shown, the first substrate SUB1 may include a plurality of gate lines, a plurality of data lines, and a plurality of pixels connected to the gate lines and data lines, so as to drive an image. The pixels are arranged in a matrix shape defined by the first and second directions DR1 and DR2. The pixels are respectively connected to a corresponding data line among the gate lines, and a corresponding data line among the data lines. The pixels receive electrical signals from the corresponding gate lines and data lines to generate an image.

Also, each of the pixels may include at least one thin film transistor and a display element. Here, the display element may be a liquid crystal capacitor.

The second substrate SUB2 may be disposed on the first substrate SUB1 and may include a common electrode (not shown).

In an exemplary embodiment, the display panel DP according to an exemplary embodiment of the invention may be any one panel having a mode of a vertical alignment ("VA") mode, a patterned vertical alignment ("PVA") mode, an in-plane switching ("IPS") mode, a fringe-field switching ("FPS") mode, or a plane to line switching ("PLS") mode, for example. That is, the display panel DP according to an exemplary embodiment of the invention is not limited to a panel of a specific mode.

The backlight unit BLU may be disposed between the display panel DP and the receiving member 200. Specifically, the backlight unit BLU may include a reflective plate RP, a light guide plate LGP, a plurality of sheets FS, a light source LS and an optical adjustment member LM.

The reflective plate RP may be disposed between the light guide plate LGP and the receiving member 200. In an exemplary embodiment, the reflective plate RP may include a light-reflecting material such as polyethylene terephthalate ("PET") or aluminum, for example. Accordingly, the reflective plate RP may be disposed under the light guide plate LGP and may reflect the light transmitted from the light guide plate LGP.

The light guide plate LGP may be disposed between the sheets FS and the reflective plate RP and may be received in the receiving member 200. Any one side surface extending in the first direction DR1 among side surfaces of the light guide plate LGP may face the light source LS. That is, the light guide plate LGP may receive the light outputted from a plurality of light emitting elements LG of the light source LS through the one side surface and may transmit the received light to the display panel DP.

Also, according to an exemplary embodiment of the invention, the light guide plate LGP may include a glass material, for example. However, the exemplary embodiment of the invention is not limited thereto, and the light guide plate LGP may include various other materials.

The sheets FS are disposed over the light guide plate LGP. The sheets FS may adjust the path of the light emitted from the light guide plate LGP and incident toward the display panel DP. In an exemplary embodiment, the sheets FS may include a protective sheet for protecting a rear surface of the display panel DP, a prism sheet for improving brightness, and a diffusion sheet for diffusing light.

The light source LS includes a plurality of light emitting elements LG and a printed circuit board PB on which a plurality of light emitting elements LG are disposed. The light source LS may be received in the receiving member 200 so as to face any one side surface of side surfaces of the light guide plate LGP.

The printed circuit board PB may have a shape extending in the first direction DR1, and the light emitting elements LG may be arranged in the first direction DR1 on the printed circuit board PB. These light emitting elements LG may generate light desired for displaying an image, and may output the generated light to the one side surface of the light guide plate LGP.

Hereinafter, the light incident to the one side surface of the light guide plate LGP is referred to as incident light, and the light provided from the light guide plate LGP to the display panel DP is referred to as outgoing light.

As illustrated in FIG. 2, the display panel DP may include a displaying surface on which an image is substantially displayed. This displaying surface may correspond to the display area DA described above with reference to FIG. 1. In an exemplary embodiment of the invention, the display panel DP is described to include a first displaying surface DP-1, a second displaying surface DP-2, and a third displaying surface DP-3, for example.

Also, the first to third outgoing light L1 to L3 outputted through an outgoing surface U may be guided to the display panel DP in the third direction DR3.

Specifically, the incident light LIGHT outputted from the light source LS may be incident to one side surface S of the light guide plate LGP. In this case, with respect to the one surface S of the light guide plate LGP, as the incident light LIGHT is guided in the second direction DR2, the short-wavelength strength of the incident light LIGHT may be decreased. Accordingly, as the incident light LIGHT is guided in the second direction DR2, the color distortion of an image displayed on the third displaying surface DP-3 may be stronger than that on the first displaying surface DP-1.

The first outgoing light L1 is described to be transmitted to the first displaying surface DP-1 through the outgoing surface U, for example. The second outgoing light L2 is described to be transmitted to the second displaying surface DP-2 through the outgoing surface U, for example. The third outgoing light L3 is described to be transmitted to the third displaying surface DP-3 through the outgoing surface U, for example.

In this case, the short-wavelength strength of the second outgoing light L2 transmitted to the second displaying surface DP-2 may be further decreased than that of the first outgoing light L1 transmitted to the first displaying surface DP-1. Also, the short-wavelength strength of the third outgoing light L3 transmitted to the third displaying surface DP-3 may be further decreased than that of the second outgoing light L2 transmitted to the second displaying surface DP-2.

This is because the light guide plate LGP including a glass has a property of absorbing more light components corresponding to short wavelengths than light components corresponding to long wavelengths. Here, the long wavelengths may be yellow and red components having wavelengths of a range from about 560 nm to about 780 nm of the visible light range, for example. The short wavelengths may be a blue component having wavelengths of a range from about 360 nm to about 480 nm of the visible light range, for example.

Accordingly, as the incident light LIGHT incident through the one surface S of the light guide plate LGP is guided in the second direction DR2, the strength of short wavelengths having a blue component may be decreased. That is, the long wavelength component may be recognized stronger than the short wavelength component from the third displaying surface DP-3 than from the first displaying surface DP-1. As an example, the yellow component may be displayed stronger on the second displaying surface DP-2 than on the first displaying surface DP-1.

As illustrated in FIG. 3, a component of any one color may be stronger on the third displaying surface DP-3 than on the first displaying surface DP-1. That is, the yellow component which has a long wavelength may be stronger on the third displaying surface DP-3 than on the first displaying surface DP-1.

According to an exemplary embodiment, to reduce this color distortion phenomenon, the optical adjustment member LM illustrated in FIG. 1 may be disposed between the light guide plate LGP and the reflective plate RP. The optical adjustment member LM may include a plurality of scattering particles which increase the strength of a light component corresponding to a specific wavelength range. Especially, the strength of light components may be adjusted according to the sizes of the scattering particles. This will be described in detail with reference to FIG. 6.

According to an exemplary embodiment, the optical adjustment member LM may be disposed so as not to overlap the entire region of the reflective plate RP but to overlap at least one portion of the reflective plate RP.

As an example, the optical adjustment member LM according to an exemplary embodiment of the invention may be disposed adjacent to another side surface facing the one side surface S of the light guide plate LGP in the second direction DR2.

In an exemplary embodiment, on the third displaying surface DP-3 illustrated in FIG. 2, the color distortion according to a ling wavelength may be the strongest. Accordingly, the optical adjustment member LM may be disposed in the third direction DR3 on the reflective plate RP overlapping the third displaying surface DP-3. As a result, the colors of an image displayed on the third displaying surface DP-3 may be prevented from being distorted. This optical adjustment member LM will be described in more detail with reference to FIGS. 4 to 9.

Figure 4:
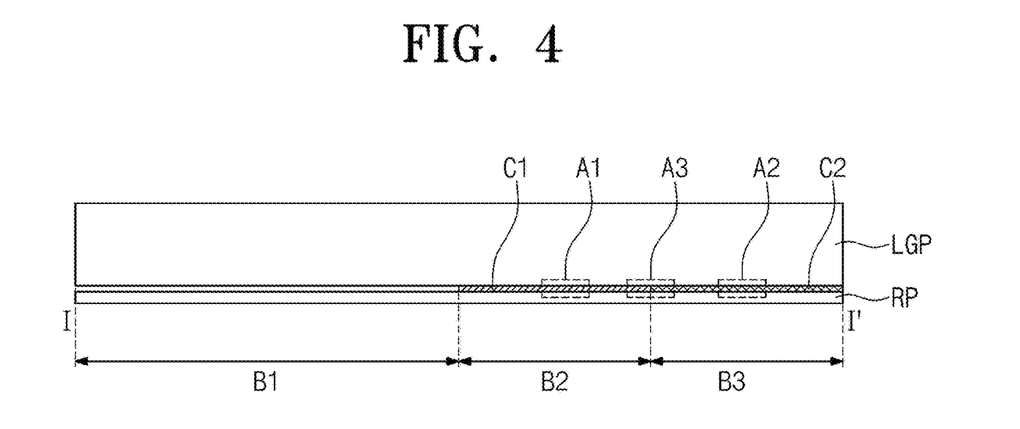
FIG. 4 is a cross-sectional view taken along line I-I' of FIG. 1 according to an embodiment of the invention.

FIG. 4 is a cross-sectional view taken along line I-I' of FIG. 1 according to an exemplary embodiment of the invention.

The cross-sectional view taken along line I-I' of FIG. 1 may be a view in which the configuration of the receiving member 200 illustrated in FIG. 1 is not provided. Also, the reflective plate RP may include a first reflective region B1, a second reflective region B2, and a third reflective region B3. In an exemplary embodiment, the first reflective region B1 may overlap the first displaying surface DP-1 illustrated in FIG. 2. The second reflective region B2 may overlap the second displaying surface DP-2 illustrated in FIG. 2. The third reflective region B3 may overlap the third displaying surface DP-3 illustrated in FIG. 2.

Specifically, referring to FIGS. 1 and 4, the optical adjustment member LM according to the invention may include a first optical adjustment member C1 and a second optical adjustment member C2. The first optical adjustment member C1 and a second optical adjustment member C2 may be disposed between the light guide plate LGP and the reflective plate RP.

The first optical adjustment member C1 may be disposed on the reflective plate RP to overlap the second reflective region B2 of the reflective plate RP. In this case, the first optical adjustment member C1 may receive the incident light from the light guide plate LGP and may scatter the received incident light toward the light guide plate LGP. Especially, the first optical adjustment member C1 according to an exemplary embodiment of the invention may scatter more light corresponding to a short wavelength than that corresponding to a long wavelength. As a result, the short-wavelength strength of the outgoing light outputted from the region of the light guide plate LGP may be increased, the region overlapping the second reflective region B2 of the reflective plate RP.

Accordingly, the short-wavelength strength of the incident light outputted from the light source LS may be decreased as being guided in the second direction DR2 according to the characteristic of the light guide plate LGP. However, the short-wavelength strength of the incident light may be reinforced by the first optical adjustment member C1. That is, the outgoing light according to a normal wavelength range may be outputted from the light guide plate LGP to be provided to the display panel DP.

The second optical adjustment member C2 may be disposed on the reflective plate RP to overlap the third reflective region B3 of the reflective plate RP. In this case, the second optical adjustment member C2 may receive the incident light from the light guide plate LGP and may scatter the received incident light toward the light guide plate LGP. Also, similar to the first optical adjustment member C1, the second optical adjustment member C2 according to an exemplary embodiment of the invention may scatter more light corresponding to a short wavelength than that corresponding to a long wavelength. As a result, the short-wavelength strength of the outputted from the region of the light guide plate LGP may be increased, the region overlapping the third reflective region B3 of the reflective plate RP.

Accordingly, the short-wavelength strength of the incident light outputted from the light source LS may be decreased as being guided in the second direction DR2 according to the characteristic of the light guide plate LGP. However, the short-wavelength strength of the incident light may be reinforced by the second optical adjustment member C2. That is, the outgoing light according to a normal wavelength range may be outputted from the light guide plate LGP to be provided to the display panel DP.

According to an exemplary embodiment, the first optical adjustment member C1 and the second optical adjustment member C2 may be disposed on the reflective plate RP to be spaced apart from each other in the second direction DR2 or to overlap each other in at least a portion thereof. Also, the first optical adjustment member C1 and the second optical adjustment member C2 may be disposed on the reflective plate RP with the same area or areas different from each other.

According to an exemplary embodiment, the second optical adjustment member C2 may further increase the short-wavelength strength of the incident light than the first optical adjustment member C1. That is, the optical adjustment member according to an exemplary embodiment of the invention may be implemented such that the farther the optical adjustment member is disposed from the one surface of the light guide plate LGP through which the incident light is provided, the stronger the short-wavelength strength is increased.

Also, according to an exemplary embodiment, a separate optical adjustment member may not be disposed in the first reflective region B1 on the reflective plate RP. This is because the short-wavelength strength of the incident light is almost not changed in the first reflective region B1. That is, the display device according to an exemplary embodiment of the invention may include the optical adjustment member disposed between one region of the light guide plate LGP and the reflective plate RP in which the short-wavelength strength of the incident light is decreased.

Figure 5:
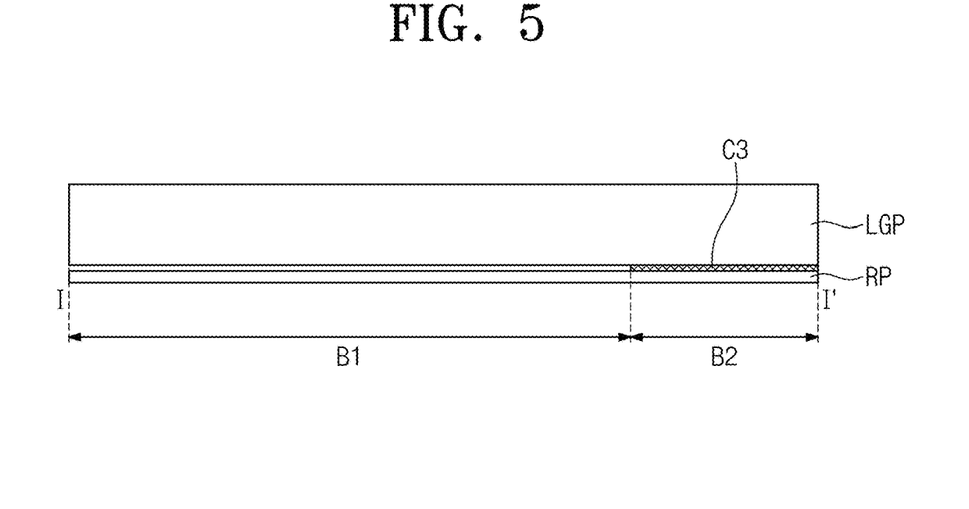
FIG. 5 is a cross-sectional view taken along line I-I' of FIG. 1 according to the invention.

FIG. 5 is a cross-sectional view taken along line I-I' of FIG. 1 according to another exemplary embodiment of the invention.

In comparison with FIG. 4, in FIG. 5, only the number of optical adjustment members LM (refer to FIG. 1) may be different, but the remaining configuration may be the same.

Specifically, FIG. 4 illustrates a structure in which the first and second optical adjustment members C1 and C2 are disposed between the light guide plate LGP and the reflective plate RP. However, FIG. 5 illustrates a structure in which a single optical adjustment member C3 may be disposed between a light guide plate LGP and a reflective plate RP.

That is, when the single optical adjustment member C3 is disposed on the reflective plate RP, the optical adjustment member C3 may be disposed on the reflective plate RP to be adjacent to the another side surface facing the one surface of the light guide plate LGP in a second direction DR2. In this case, a reflective region B1 of the reflective plate RP in which the optical adjustment is not disposed may be greater than a region B2 of the reflective plate RP in which the single optical adjustment member C3 is disposed.

As described above, on the basis of the short-wavelength strength of outgoing light outputted from the light guide plate LGP, at least one optical adjustment member LM may be disposed on the reflective plate RP.

Figure 6:
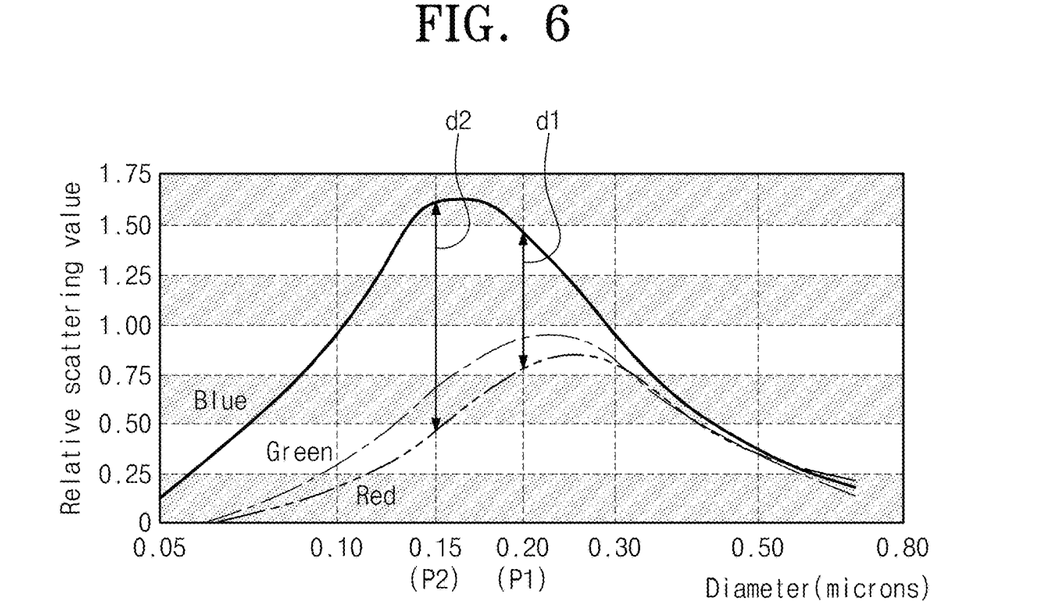
FIG. 6 is a graph illustrating a change in scattering values of incident light according to sizes of scattering particles.
Figure 7:
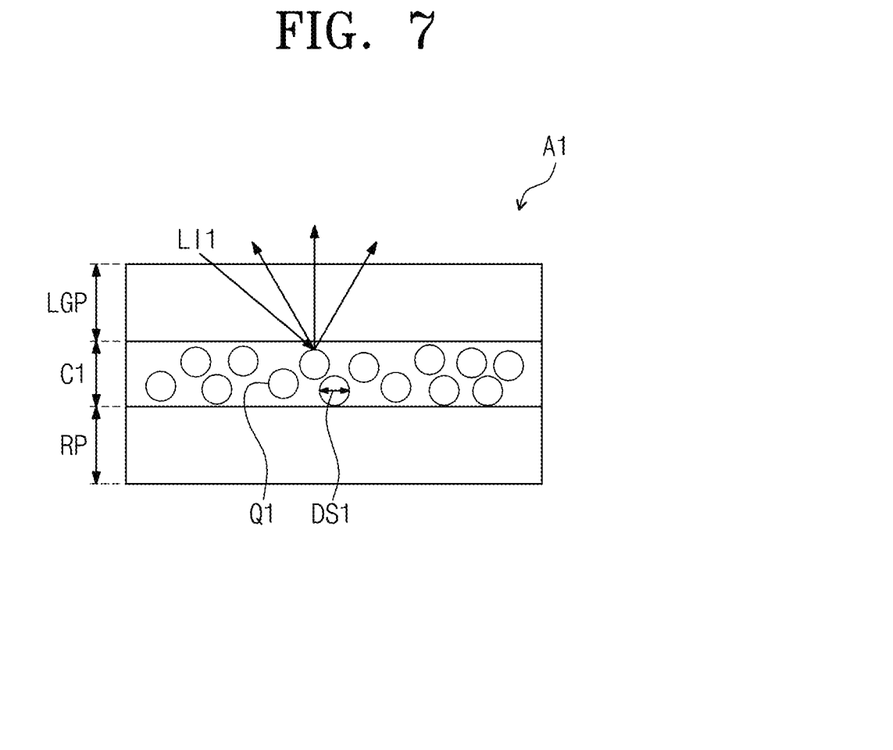
FIG. 7 is an enlarged view of region A1 illustrated in FIG. 4 according to an embodiment of the invention.
Figure 8:
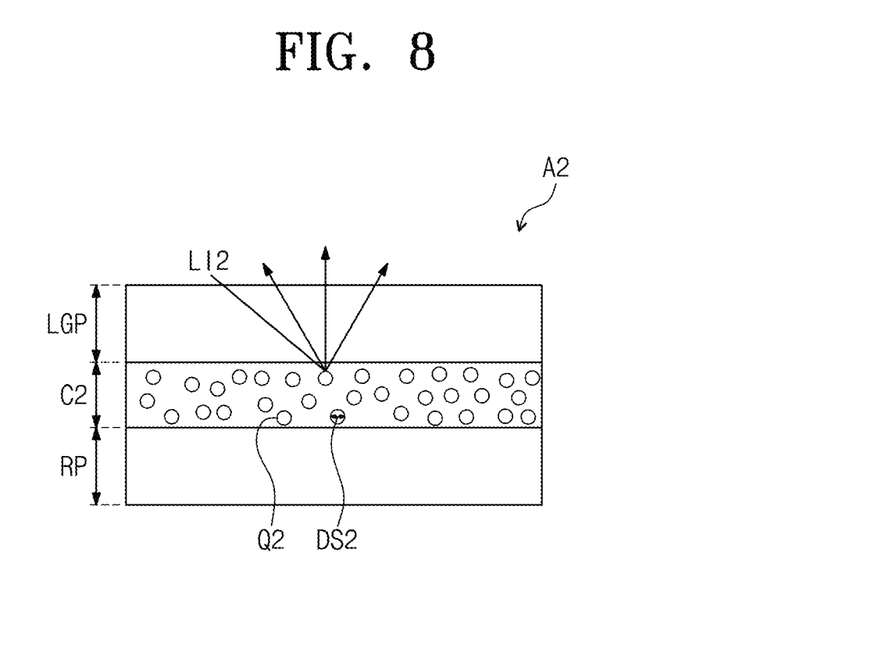
FIG. 8 is an enlarged view of region A2 illustrated in FIG. 4 according to the invention.

FIG. 6 is a graph illustrating a change in scattering values of incident light according to sizes of scattering particles. FIG. 7 is an enlarged view of region A1 illustrated in FIG. 4 according to an exemplary embodiment of the invention. FIG. 8 is an enlarged view of region A2 illustrated in FIG. 4 according to an exemplary embodiment of the invention.

First, referring to FIGS. 6 to 8, the horizontal axis represents the diameters of the scattering particles and the vertical axis represents relative scattering values of incident light. Here, a short wavelength may be a wavelength range of blue, and a long wavelength may be a wavelength range of red and yellow, for example. The wavelength range of green may be a range between the short wavelength and the long wavelength, for example.

Specifically, the first optical adjustment member C1 includes a plurality of first scattering particles Q1. Each of the first scattering particles Q1 may be a particle having a first diameter DS1. The second optical adjustment member C2 includes a plurality of second scattering particles Q2. Each of the second scattering particles Q2 may be a particle having a second diameter DS2. In an exemplary embodiment, the first diameter DS1 may be greater than the second diameter DS2. As a result, the sizes of the first scattering particles Q1 may be greater than those of the second scattering particles Q2.

According to an exemplary embodiment, the first and second scattering particles Q1 and Q2 may be applied as titanium oxide ($TiO_2$), for example.

As illustrated in FIG. 6, it may be understood that the scattering value of the incident light corresponding to a wavelength of each color varies according to sizes of scattering particles.

As an example, when the first scattering particles Q1 have a first diameter P1 of about 0.2 micrometer (μm), the difference between the scattering value of the incident light corresponding to the wavelength range of blue and the scattering value of the wavelength range of red may have a first difference value d1.

As another example, when the second scattering particles Q2 have a second diameter P2 of about 0.15 μm, the scattering value of the incident light corresponding to blue wavelength range may have a maximum value. Accordingly, when the second scattering particles Q2 have a second diameter P2 of about 0.15 μm, the second scattering particles Q2 may maximally scatter the blue wavelength range of the incident light. Also, when the second scattering particles Q2 have the second diameter P2, the difference between the scattering value of the red wavelength range and the scattering value of the blue wavelength range may have a second difference value d2.

As in the graph illustrated in FIG. 6, the first difference value d1 may be smaller than the second difference value d2.

Also, referring to FIGS. 7 and 8, the incident light LI1 through one side surface S (refer to FIG. 2) of the light guide plate LGP may be guided toward the first optical adjustment member C1. In this case, the incident light LI1 guided toward the first optical adjustment member C1 may be scattered by the first scattering particles Q1 and guided toward the light guide plate LGP.

Likewise, the incident light LI2 through one side surface S of the light guide plate LGP may be guided toward the second optical adjustment member C2. In this case, the incident light LI2 guided toward the second optical adjustment member C2 may be scattered by the second scattering particles Q2 and guided toward the light guide plate LGP.

According to an exemplary embodiment, the light scattered by the second scattering particles Q2 may have a wavelength range which has a scattering value higher than that in the case of the light scattered by the first scattering particles Q1. That is, the greater the difference in the scattering values of the red wavelength range and the blue wavelength range according to sizes of scattering particles, the greater the short-wavelength strength of the incident light. Hereinafter, the difference in the scattering values of the red wavelength range and the blue wavelength range according to sizes of scattering particles will be described with comparison values.

As described above, as the incident light through the one surface S of the light guide plate LGP is guided in the second direction DR2, the strength of short wavelength having blue components may be decreased. On the contrary, the higher the difference of the comparison values, the higher the short-wavelength strength of the incident light.

Accordingly, the display device according to an exemplary embodiment of the invention may provide at least one optical adjustment member in the second direction DR2 with respect to the one side surface of the light guide plate LGP. In this case, the optical adjustment member which is disposed father from the one surface S of the light guide plate LGP in the second direction DR2 may have the largest comparison values.

Also, the comparison values may be adjusted according to the sizes of the scattering particles. Specifically, as the graph illustrated in FIG. 6, when the sizes of scattering particles are included within a specific diameter range, the smaller the size of the scattering particles, the greater the comparison values. Here, the specific diameter range may be about 0.15 μm to about 0.20 μm. In an exemplary embodiment, the comparison values may be greater for the second scattering particles Q2 with the second diameter D2 than the first scattering particles Q1 with the first diameter DS1. Accordingly, the short wavelength component of the light outputted from the light guide plate LGP may be more increased by the second scattering particles Q2 than by the first scattering particles Q1.

Figure 9:
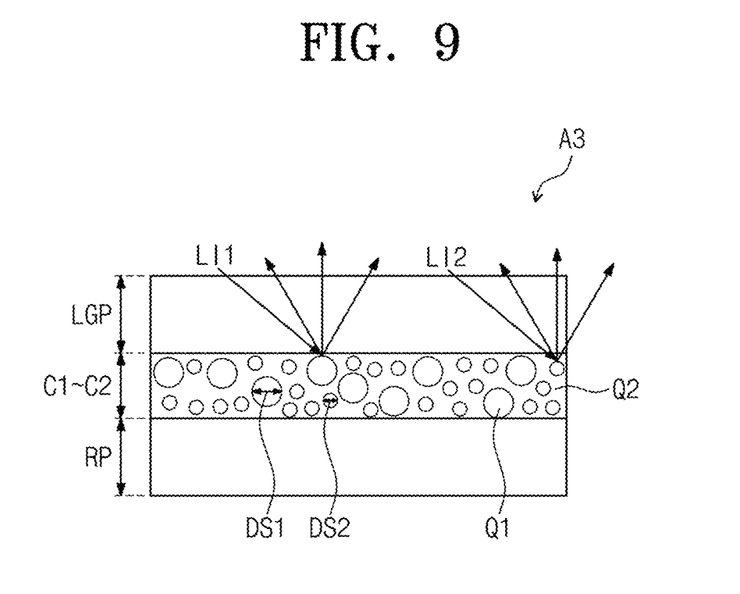
FIG. 9 is an enlarged view of region A3 illustrated in FIG. 4 according to another embodiment of the invention.

FIG. 9 is an enlarged view of region A3 illustrated in FIG. 4 according to another exemplary embodiment of the invention.

Referring to FIGS. 4 and 9, the first and second optical adjustment members C1 and C2 may be disposed such that at least one portion thereof overlaps each other. In this case, the first and second scattering particles Q1 and Q2 may be provided such that at least one portion thereof overlaps each other on the reflective plate RP.

Figure 10:
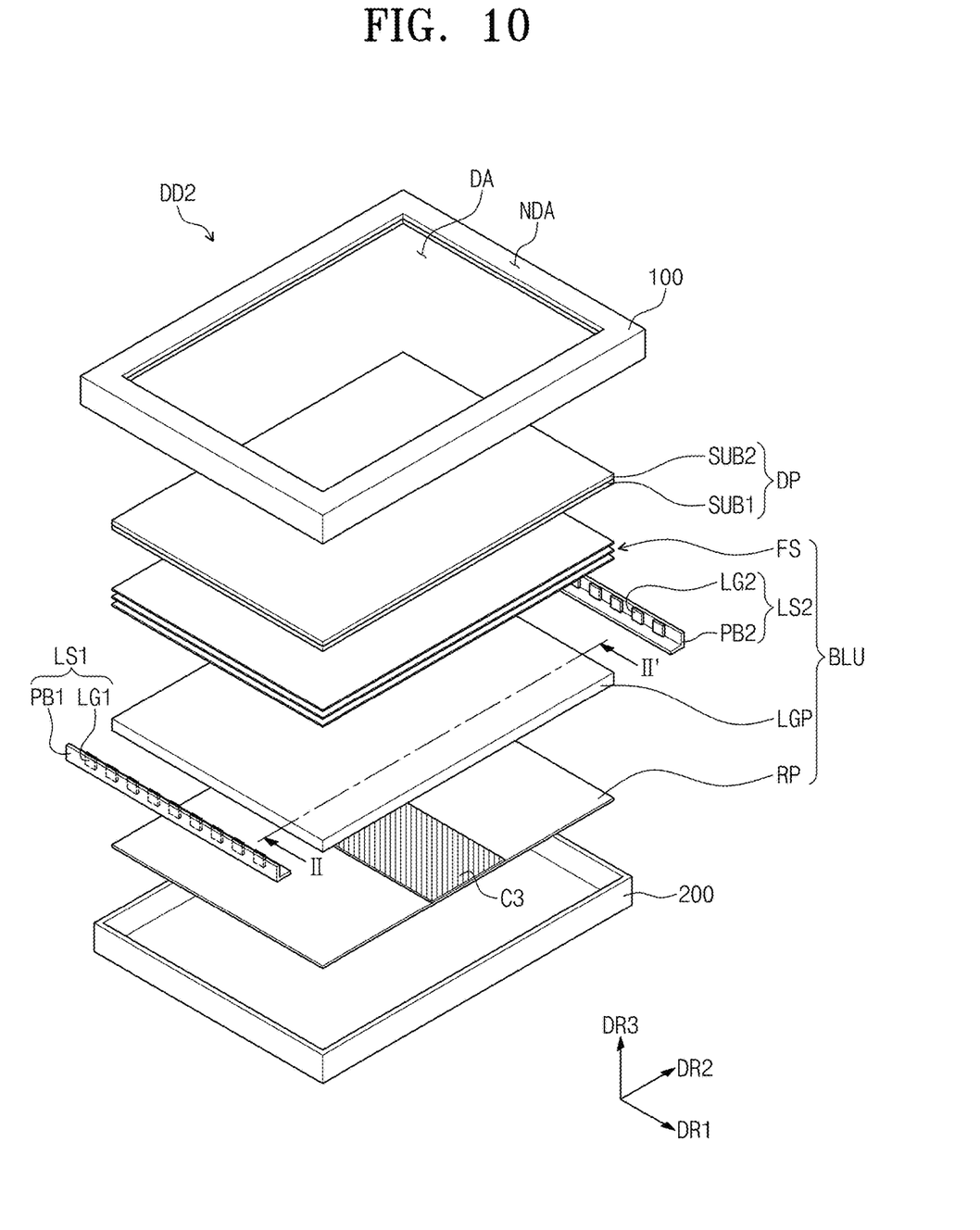
FIG. 10 is an exploded view of another embodiment of a display device according to the invention.
Figure 11:
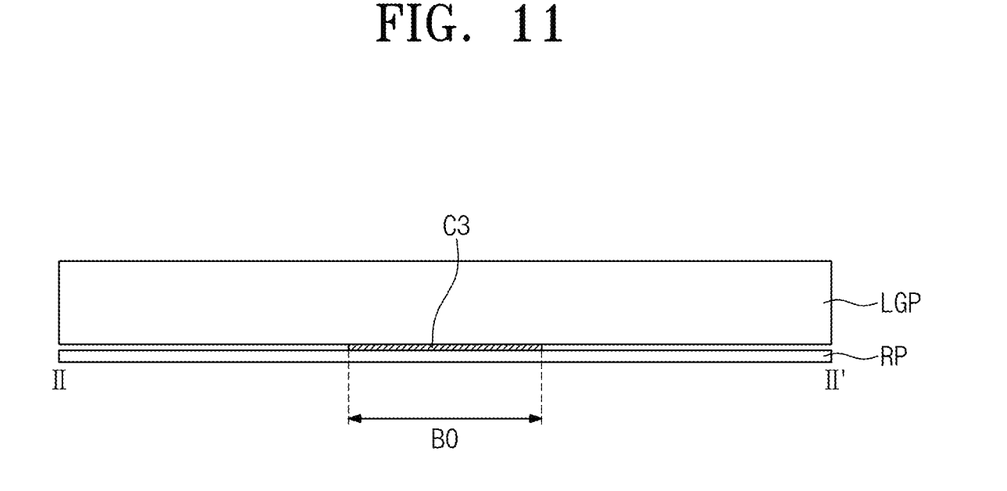
FIG. 11 is a cross-sectional view taken along line II-IF of FIG. 10 according to the invention.

FIG. 10 is an exploded view of a display device according to another exemplary embodiment of the invention. FIG. 11 is a cross-sectional view taken along line II-II' of FIG. 10 according to another exemplary embodiment of the invention.

A display device DD2 illustrated in FIG. 10 is different from the display device DD illustrated in FIG. 1 in only the configuration of the light source and optical adjustment member, but the remaining configuration thereof may be the same as each other. Accordingly, descriptions of the remaining configuration will not be provided.

Referring to FIGS. 10 and 11, the display device DD2 may include at least two or more light sources. As such, when two or more light sources are included in a display device DD2, it may be the case in which the display device is applied to a large-area display device such as a television.

Specifically, the display device DD2 may include a first light source LS1 and a second light source LS2.

The first light source LS1 may include a plurality of first light emitting elements LG1 and a first printed circuit board PB1 on which the first light emitting elements LG1 are disposed. The first light source LS1 may be received in a receiving member 200 so as to face any one side surface of the side surfaces of the light guide plate LGP.

The printed circuit board PB1 may have a shape extending in the first direction DR1, and the first light emitting elements LG1 may be arranged in the first direction DR1 on the first printed circuit board PB1. These light emitting elements LG1 may generate light desired for displaying an image, and may output the generated light to a first side surface of the light guide plate LGP. Hereinafter, the light incident to the one side surface of the light guide plate LGP is referred to as first incident light, and the light provided from the light guide plate LGP to the display panel DP is referred to as first outgoing light.

The second light source LS2 may include a plurality of second light emitting elements LG2 and a second printed circuit board PB2 on which the second light emitting elements LG2 are disposed. The second light source LS2 may be received in the receiving member 200 so as to face a second side surface opposite to the first side surface in the second direction DR2 among the side surfaces of the light guide plate LGP.

The second printed circuit board PB2 may have a shape extending in the first direction DR1, and the second light emitting elements LG2 may be arranged in the first direction DR1 on the second printed circuit board PB2. These second light emitting elements LG2 may generate light desired for displaying an image, and may output the generated light to the second side surface of the light guide plate LGP. Hereinafter, the light incident to the second side surface of the light guide plate LGP is referred to as second incident light, and the light provided from the light guide plate LGP to the display panel DP is referred to as second outgoing light.

As such, the first and second light sources LS1 and LS2 may output the incident light through the first and second side surfaces of the light guide plate LGP. In this case, according to the characteristics of absorbing the light of blue wavelength range of the light guide plate LGP, the short-wavelength strength of the outgoing light outputted toward the display panel DP in a central region BO of the light guide plate LGP corresponding to a reflective region B0 may be decreased.

According to an exemplary embodiment, the light guide plate LGP may be applied to include a glass material.

According to an exemplary embodiment, the optical adjustment member C3 may be disposed between the light guide plate LGP and the reflective plate RP to prevent a color from being distorted in this central region BO. Especially, the optical adjustment member C3 is disposed on the central region BO of the light guide plate LGP in the second direction DR2, so that the short-wavelength strength of the outgoing light outputted from the central region BO of the light guide plate LGP may be increased.

According to embodiments of the invention, the color distortion of an image displayed on the display panel may be prevented.

Hitherto, the best mode has been disclosed in the drawings and specification. While specific terms have been used, they have been not used to limit the meaning or the scope of the invention described in Claims, but merely used to explain the invention. Accordingly, a person having ordinary skill in the art will understand from the above that various modifications and other equivalent embodiments are also possible. Hence, the real protective scope of the invention shall be determined by the technical scope of the accompanying Claims.

What is claimed is:

1. A display device comprising:
    a display panel which includes a displaying surface defined by a first direction and a second direction;
    a light guide plate which is disposed under the display panel;
    a light source which provides an incident light to a side surface extending in the first direction among side surfaces of the light guide plate;
    a reflective plate which is disposed under the light guide plate;
    a first optical adjustment member which is disposed between the reflective plate and the light guide plate and includes first scattering particles which scatter a first color wavelength range of the incident light into a first value, and scatter a second color wavelength range of the incident light into a second value, wherein the difference between the first value and the second value is defined as a first difference value; and
    a second optical adjustment member which is disposed between the reflective plate and the light guide plate and includes second scattering particles which scatter the first color wavelength range of the incident light into a third value, and scatter the second color wavelength range of the incident light into a fourth value, wherein the difference between the third value and the fourth value is defined as a second difference value higher than the first difference value,
    wherein the first difference value is adjusted according to sizes of the first scattering particles,
    the second difference value is adjusted according to sizes of the second scattering particles, and
    the first optical adjustment member is disposed more adjacent to the side surface in the second direction than to the second optical adjustment member.

2. The display device of claim 1, wherein the first optical adjustment member overlaps the second optical adjustment member in at least one portion.

3. The display device of claim 1, wherein the first optical adjustment member, on the reflective plate, is spaced apart from the second optical adjustment member in the second direction.

4. The display device of claim 3, wherein the second optical adjustment member is disposed adjacent to another side surface facing the side surface in the second direction.

5. The display device of claim 1, wherein when sizes of the first scattering particles and sizes of the second scattering particles are included within a first range, the second difference value is greater than the first difference value as the sizes of the first and second scattering particles are smaller in the first range.

6. The display device of claim 5, wherein the first range is from about 0.15 micrometer to about 0.20 micrometer.

7. The display device of claim 1, wherein the first color wavelength range is defined as a wavelength range of blue light, and the second color wavelength range is defined as a wavelength range of one of red and yellow light.

8. The display device of claim 1, wherein areas of the first and second optical adjustment members are different from each other.

9. A display device comprising:
    a display panel which includes a displaying surface defined by first and second directions;
    a light guide plate which is disposed under the display panel;
    a light source which provides an incident light to a side surface extending in the first direction among side surfaces of the light guide plate;
    a reflective plate which is disposed under the light guide plate; and
    an optical adjustment member which is disposed between the reflective plate and the light guide plate and includes scattering particles which scatter a first color wavelength range of the incident light into a first value, and scatter a second color wavelength range of the incident light into a second value,
    wherein the difference between the first value and the second value is defined as a first difference value, and
    the optical adjustment member is disposed adjacent to another side surface facing the side surface in the second direction.

10. The display device of claim 9, wherein when sizes of the scattering particles are included within the first range, the first difference value is greater as the sizes of the scattering particles are smaller in the first range.

11. The display device of claim 10, wherein the first range is from about 0.15 micrometer to about 0.20 micrometer.

12. The display device of claim 9, wherein the optical adjustment member contacts the another side surface in the second direction.

13. The display device of claim 9, wherein the first color wavelength range is defined as a wavelength range of blue light, and the second color wavelength range is defined as a wavelength range of one of red and yellow light.

14. A display device comprising:
a display panel which includes a displaying surface defined by first and second directions;
a light guide plate which is disposed under the display panel;
a first light source which provides an incident light to a side surface extending in the first direction among side surfaces of the light guide plate;
a second light source which provides the incident light to another side surface facing the side surface;
a reflective plate which is disposed under the light guide plate; and
an optical adjustment member which is disposed between the reflective plate and the light guide plate and includes scattering particles which scatter a first color wavelength range of the incident light into a first value, and scatter a second color wavelength range of the incident light into a second value,
wherein the difference between the first value and the second value is defined as a first difference value, and
the optical adjustment member is disposed on a central portion between the side surface and the another side surface facing the side surface in the second direction.

15. The display device of claim 14, wherein the optical adjustment member further comprises second scattering particles which scatter the first color wavelength range into a third value and scatter the second color wavelength range into a fourth value, wherein the difference between the third and fourth values are defined as a second difference value greater than the first difference value.

16. The display device of claim 14, wherein when the sizes of the scattering particles are included within the first range, the first difference value is larger as the sizes of the scattering particles are smaller in the first range.

17. The display device of claim 16, wherein the first range is from about 0.15 micrometer to about 0.20 micrometer.

18. The display device of claim 14, wherein the light guide plate includes a glass.

19. The display device of claim 14, wherein the first color wavelength range is defined as a wavelength range of blue light, and the second color wavelength range is defined as the wavelength range of one of red and yellow light.

20. The display device of claim 14, wherein the reflective plate comprises a first reflective region on which the scattering particles are not disposed and a second reflective region on which the scattering particles are disposed.

* * * * *